E. P. HOVEY.
WIND SHIELD.
APPLICATION FILED APR. 22, 1918.
1,298,719.
Patented Apr. 1, 1919.
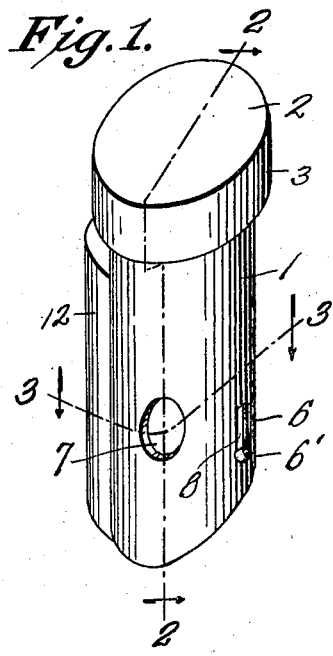
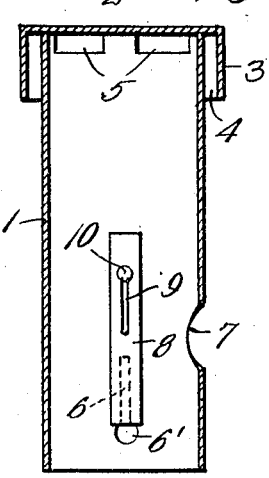
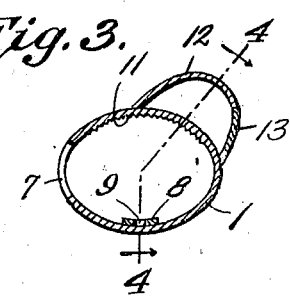
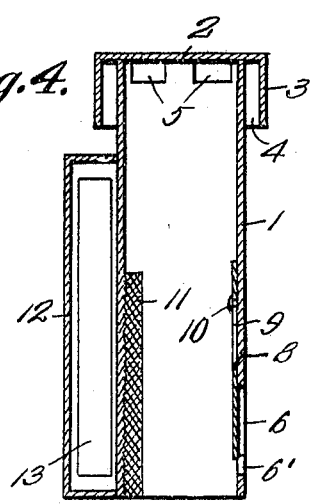
INVENTOR
Edward P. Hovey,
WITNESSES
James F. Crown
S. M. McColl
BY Richard B. Owen,
ATTORNEY

UNITED STATES PATENT OFFICE.

EDWARD P. HOVEY, OF EAST QUOGUE, NEW YORK.

WIND-SHIELD.

1,298,719.　　　　　Specification of Letters Patent.　　Patented Apr. 1, 1919.

Application filed April 22, 1918. Serial No. 230,152.

*To all whom it may concern:*

Be it known that I, EDWARD P. HOVEY, a citizen of the United States, residing at East Quogue, in the county of Suffolk and State of New York, have invented certain new and useful Improvements in Wind-Shields, of which the following is a specification.

This invention relates to a windshield for protecting a match used in lighting pipes, lanterns and the like.

The object thereof is to construct an article of this character which, while very effective is extremely simple and very small so as to provide for its being carried in the pocket of the owner.

Another object is to so construct a device of this character that the pipe, cigar, cigarette, lamp or other object may be lighted at any time with the strongest wind blowing, without being in any way affected thereby.

Another object is to provide a combined match box and windshield for protecting a match to be lighted.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a perspective view of an article constructed in accordance with this invention, Fig. 2 is a longitudinal section thereof taken on the line 2—2 of Fig. 1, Fig. 3 is a horizontal section taken on the line 3—3 of Fig. 1, and Fig. 4 is a longitudinal section taken on the line 4—4 of Fig. 3.

In the embodiment illustrated, the device comprising this invention is composed of a cylinder 1, preferably of metal and which is preferably elliptical in cross section, although it need not necessarily be of this cross sectional contour. This cylinder is open at its lower end and closed at its upper end by a cap 2 which extends laterally beyond the side walls of the cylinder and is provided with a depending skirt or flange 3 carried by the periphery thereof forming a space 4 between said skirt and the side wall of the cylinder. The cylinder at its upper end is provided in its side walls with a plurality of openings 5 which communicate with the space 4 and are designed for ventilating the cylinder to produce the necessary draft to aid combustion.

This cylinder 1 has a slot 6 extending longitudinally thereof in one side wall, said slot being here shown in the form of what is known as a keyhole slot, the larger end 6' being arranged nearer the open end of the cylinder and adapted for the insertion of a match therethrough to be lighted. This cylinder also has an aperture 7 in one of its side walls disposed in a plane above the slot 6, and spaced laterally therefrom so that the cigar or cigarette inserted through the aperture 7 will be positioned in the path of the match inserted through the slot 6.

A slide 8 is mounted on the inner face of the cylinder over the slot 6 and is designed to move freely on a headed stud 10 which projects laterally inward from the cylinder as is shown clearly in Fig. 2, and extends through the slot 9 formed in the slide 8, said slot being of a length sufficient to permit the slide to extend over the greater portion of the slot 6 when in its extreme lowered position as shown in Figs. 2 and 4. This slide 8 moves freely on the stud 10 so that when the match is inserted through the larger end 6' of the slot and is moved upwardly the slide will be moved with it, and when the match moves in the opposite direction, the slide will follow it so that the greater portion of the slot is always closed preventing danger of the match being put out by draft.

A scratching surface 11 is carried by the inner face of the cylinder directly opposite the slot 6 and may be of any suitable abrasive material, the cylinder wall being here shown serrated for this purpose (see Fig. 3).

A match receptacle 12 is preferably mounted on the upper face of the cylinder 1, and has a closure 13, so that access thereto may be readily obtained.

In the use of this shield, when it is desired for lighting a pipe, the lower open end thereof is fitted over the bowl of the pipe and the match inserted through slot 6 and forcibly engaged with the scratching surface 11 to cause the ignition thereof, and when so ignited, the tobacco in the pipe may be readily lighted without danger of the match being extinguished. The elliptical cross sectional shape of the cylinder especially adapts it for use in connection with pipe bowls, although obviously it may be used for lighting lamps, lanterns and the like.

When the device is to be used for lighting a cigar or cigarette, the object to be lighted is inserted through the aperture 7 which effects a closing of this aperture, and then the match is inserted through slot 6 and forcibly engaged with the scratching surface 11 to produce a flame into the path of which the cigar or cigarette to be lighted extends.

From the above description it will be obvious that this device, while extremely simple and cheap to manufacture, will be thoroughly effective for the purpose for which it it designed, and being of a very small size may be readily carried in the pocket of the user and will afford ample protection for the match to be lighted, even in a very high wind.

The foregoing description and the drawings have reference to what may be considered the preferred or approved form of my invention. It is to be understood that I may make such changes in construction and arrangement and combination of parts, materials, dimensions, et al., as may prove expedient and fall within the scope of the claimed invention.

Having thus fully described my invention, what I claim as new and desire to secure by Letters Patent, is:—

A device of the class described comprising a cylinder open at one end and elliptical in cross section, an overhanging ventilating skirt carried by the other end thereof and spaced laterally from the side walls of the cylinder with openings in the side wall of said cylinder communicating with the space formed between it and the skirt, a scratching surface on the inner face of one side wall of said cylinder, and a slot formed in the opposed side wall thereof.

In testimony whereof I affix my signature in presence of two witnesses.

EDWARD P. HOVEY.

Witnesses:
AMOS W. SILKWORTH, Jr.,
FRANK L. TERRELL.

Copies of this patent may be obtained for five cents each, by addressing the "Commissioner of Patents, Washington, D. C."